(12) United States Patent
Ikegawa

(10) Patent No.: US 6,768,889 B2
(45) Date of Patent: Jul. 27, 2004

(54) METHOD AND APPARATUS FOR FORMING AN IMAGE ON DISPLAY MEDIUM

(75) Inventor: Akihito Ikegawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/348,335

(22) Filed: Jan. 22, 2003

(65) Prior Publication Data
US 2003/0138266 A1 Jul. 24, 2003

(30) Foreign Application Priority Data
Jan. 22, 2002 (JP) ........................................ 2002-012997

(51) Int. Cl.⁷ .............................................. G03G 15/22
(52) U.S. Cl. ...................................... 399/130; 399/158
(58) Field of Search ................................ 399/130, 136, 399/153, 158; 347/111, 122, 151, 153

(56) References Cited

U.S. PATENT DOCUMENTS

| 5,866,284 A | 2/1999 | Vincent |
| 6,222,513 B1 | 4/2001 | Howard et al. |
| 6,333,754 B1 | 12/2001 | Oba et al. |
| 6,377,757 B2 * | 4/2002 | Matsuura et al. ............... 399/1 |
| 6,407,763 B1 | 6/2002 | Yamaguchi et al. |
| 6,411,316 B1 | 6/2002 | Shigehiro et al. |

* cited by examiner

*Primary Examiner*—Hoan Tran
(74) *Attorney, Agent, or Firm*—McDermott Will & Emery LLP

(57) ABSTRACT

An image is formed on an image display medium having a display layer whose optical characteristics are changed by applying an electric field. An electrostatic latent image corresponding to the image to be formed is formed on a dielectric film having a plurality of float electrodes formed thereon by injecting an electrical charge into at least one of the float electrodes. The electric field formed by the electrostatic latent image on the dielectric film is applied to the display layer of the image display medium by bringing the electrostatic latent image formed on the dielectric film to a position opposed to the image display medium.

15 Claims, 7 Drawing Sheets

METHOD AND APPARATUS FOR FORMING AN IMAGE ON DISPLAY MEDIUM

CROSS-REFERENCE TO RELATED APPLICATION

This application is based on Japanese patent application No. 2002-12997 filed in Japan on Jan. 22, 2002, the entire content of which is hereby incorporated by reference.

BACKGROUND OF THE INVENTION

1. Field of the Invention

The present invention relates to a method and an apparatus for forming an image on an image display medium.

2. Description of Related Art

In recent years, rewritable image display media called electronic paper or digital paper have been proposed as image display medium (image recording medium) for recording an image which can be used in place of normal papers.

Various types of image display media have been proposed. Among them, many image display media have a display layer whose optical characteristics (e.g., color, light transmittance and/or light reflectance when viewed from observation side) are varied, when an electric field is applied thereto, according to the direction/or intensity of the electric field.

An image is formed on the image display medium having such display layer as follows. For example, an electrostatic latent image corresponding to an image to be formed is formed on an image carrier such as a photosensitive member, and the electrostatic latent image is transferred to the image display medium.

Then an electric field is applied to the display layer using electrical charges of the electrostatic latent image on the image display medium, whereby the image is formed by changing the optical characteristics of the display layer.

Other proposed methods include, for example, a method comprising irradiating an surface of the image display medium with ions to form an electrostatic latent image corresponding to an image to be formed on the image display medium and applying an electric field to the display layer to form the image.

However, the above-mentioned image forming methods require a power source capable of generating a voltage of as high as several kV because the methods utilize electric discharge phenomenon in forming the electrostatic latent image.

Thus the image forming apparatus are expensive accordingly. Further the image forming apparatus handles a high voltage, necessitating use of an insulating material capable of withstanding high voltage. Moreover, the image forming apparatus may possibly need a special insulation measure. Large amounts of ozone and ions which deteriorate apparatus components may be generated due to the electric discharge.

SUMMARY OF THE INVENTION

An object of the present invention is to provide a method and an apparatus for forming an image on an image display medium having a display layer whose optical characteristics are changed by application of electric field, the method and apparatus being capable of forming the image without utilizing electric discharge phenomenon.

Another object of the present invention is to provide a method and an apparatus for forming an image on an image display medium having a display layer whose optical characteristics are changed by application of electric field, the method and apparatus being capable of forming the image at a low voltage and at a low cost without a need for a power source of high voltage.

A further object of the invention is to provide a method and an apparatus for forming an image on an image display medium having a display layer whose optical characteristics are changed by application of electric field, the method and apparatus being capable of suppressing generation of ozone and ions and being environmentally beneficial accordingly.

The invention provides a method of forming an image on an image display medium having a display layer whose optical characteristics are changed by application of electric field, the method comprising the steps of:

forming an electrostatic latent image corresponding to the image to be formed on a dielectric film having a plurality of float electrodes by injecting an electrical charge into at least one of the float electrodes; and applying an electric field formed by the electrostatic latent image on the dielectric film to the display layer of the image display medium by bringing the electrostatic latent image formed on the dielectric film to a position opposed to the image display medium.

The invention also provides an apparatus for forming an image on an image display medium having a display layer whose optical characteristics are changed by application of electric field, the apparatus comprising:

a dielectric film having a plurality of float electrodes formed thereon;

a device for forming an electrostatic latent image, the device being capable of forming the electrostatic latent image corresponding to the image to be formed on the dielectric film by injecting an electrical charge into at least one float electrode among the plurality of float electrodes; and a device for applying an electric field formed by the electrostatic latent image on the dielectric film to the display layer of the image display medium by bringing the electrostatic latent image formed on the dielectric film to a position opposed to the image display medium.

The foregoing and other objects, features, aspects and advantages of the present invention will become apparent from the following detailed description and the accompanying drawings.

Figure 1:
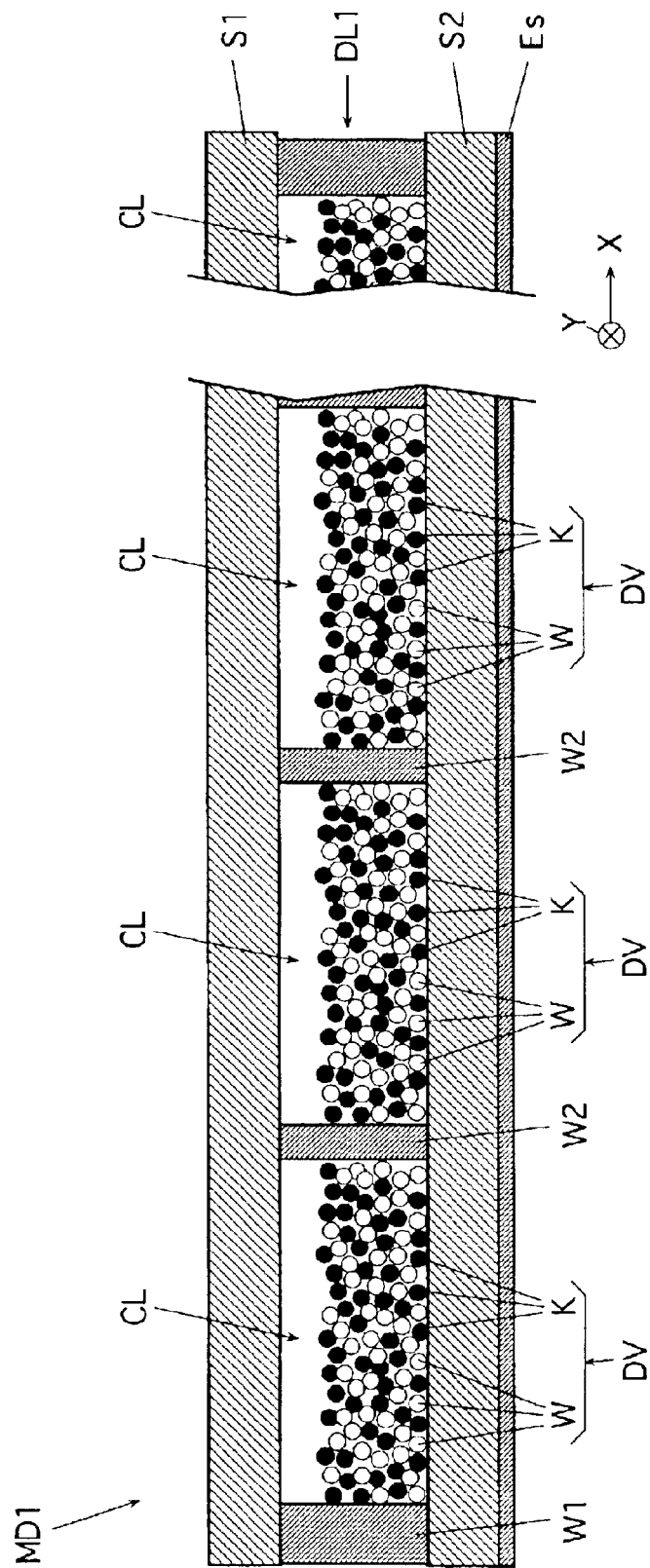
FIG. 1 is a schematic sectional view showing an example of the image display medium.

DESCRIPTION OF THE PREFERRED EMBODIMENTS (1) Image Display Medium, and Image Forming Method and Apparatus (1-1) Image Display Medium According to preferred embodiments of the invention, an image is formed on an image display medium (in other words, image recording medium, image forming medium or image display element) having the following display layer.

The display layer is such that its optical characteristics are changed by application of electric field. In other words, the display layer has optical characteristics changeable by application of electric field. The optical characteristics of the display layer variable by application of electric field include, for example, optical reflection density (e.g., color when viewed from the observation side), light reflectance, light transmittance, and so on.

In the display layer, the optical characteristics are changed, e.g., according to the direction and/or magnitude (intensity) of an electric field to be applied thereto.

A number of examples of the image display medium having such display layer will be given later.

(1-2) Image Forming Method and Apparatus

According to preferred embodiments of the present invention, an image is formed on an image display medium using a dielectric film.

In the image forming method, a step of forming an electrostatic latent image and a step of applying an electric field to be described later are carried out.

The image forming apparatus is provided to form an image on the image display medium by the foregoing image forming method, and is provided with a dielectric film, a device for forming an electrostatic latent image and a device for applying an electric field. The device for forming an electrostatic latent image and the device for applying an electric field in the image forming apparatus are employed for conducting the step of forming an electrostatic latent image and the step of applying an electric field, respectively. The following description is given mainly on the image forming method. The elucidations on the step of forming an electrostatic latent image and the step of applying an electric field are applicable to the device for forming an electrostatic latent image and the device for applying an electric field, respectively in the image forming apparatus.

The dielectric film to be used in forming an image is composed of, e.g., polyimide, polyester, polyethylene, polypropylene or the like. The dielectric film may take the form of, e.g., an endless belt.

A plurality of float electrodes are formed on the dielectric film. These float electrodes are provided, for example, at a uniform pitch over the entire range of the dielectric film surface. More specifically, the float electrodes may be formed, for example, according to each pixel of the image to be formed at a uniform pitch on the dielectric film.

In the step of forming an electrostatic latent image, an electrostatic latent image in conformity with the image to be formed is formed on the dielectric film. The electrostatic latent image is formed on the dielectric film by injecting an electrical charge into at least one float electrode among the plurality of float electrodes on the dielectric film. For example, an electrical charge is injected into each float electrode according to the image to be formed (e.g., according to image information on each pixel of the image to be formed).

The electrical charge may be injected into the float electrode, for example, by bringing an injection electrode(s) into contact with the float electrode and applying a voltage to the injection electrode. The electrical charges may be injected into the plurality of float electrodes at one time using a plurality of injection electrodes.

The electrostatic latent image may be formed on the dielectric film as described below according to the kind of image display medium for forming an image. For example, the electrostatic latent image may be formed in a way to provide a potential region of positive polarity and a potential region of negative polarity on the dielectric film.

The electrostatic latent image may be formed on the dielectric film to provide a potential region of a predetermined polarity (positive or negative polarity) and a potential region of 0[V]. The electrostatic latent image may be formed on the dielectric film to provide a first potential region of a predetermined polarity and a second potential region of the same polarity as that of the first potential region which region is lower in the potential than the first potential region. A combination of these embodiments will do.

The application of electric field is performed after forming the electrostatic latent image on the dielectric film or while forming the electrostatic latent image thereon.

In the step of applying an electric field, the dielectric film having the electrostatic latent image formed thereon is made to face the image display medium.

In conducting the step of forming an electrostatic latent image in parallel with the step of applying an electric field, the region of the dielectric film having the electrostatic latent image formed thereon is made to face the image display medium in applying the electric field.

In allowing the dielectric film to face the image display medium, the dielectic film may be contacted with or may be positioned close to the image display medium.

When the dielectric film having the electrostatic latent image formed thereon is made to face the image display medium, the electric field formed by the electrostatic latent image on the dielectric film (electrical charge(s) constituting the electrostatic latent image) is applied to the display layer of the image display medium. Typically the electric field directed orthogonally or substantially orthogonally to the display layer may be applied to the display layer.

An electrode(s) may be provided on other surface of the image display medium than the surface thereof which is made to face the dielectric film, and the electrode(s) of the image display medium may be set at a predetermined potential (e.g., earth potential) when the dielectric film is made to face the image display medium, whereby an electric field can be stably applied to the display layer.

Since an electrostatic latent image corresponding to the image to be formed is formed on the dielectric film, an electric field (electric field with an direction or magnitude according to the image information on each pixel of the image to be formed) can be applied in comformity with the image to be formed on the display region of the display layer.

Thereby the optical characteristics of the display region of the display layer can be changed according to the image to be formed so that the desired image can be formed on the image display medium.

The above-mentioned image forming method and apparatus have the following advantages.

As described above, an electrostatic latent image can be formed on the dielectric film by injecting an electrical charge into at least one of the float electrodes formed on the dielectric film. This means that the electrostatic latent image can be formed without resort to electric discharge phenomenon. Further, discharge phenomenon is not utilized in applying an electric field to the display layer of the image display medium.

Consequently in forming an image, a power source of high voltage for electric discharge operation is not required and the image formation can be effected at a low voltage. Moreover, the image forming apparatus is operable without a power source of high voltage, and does not handle a high voltage so that insulating materials of low voltage resistance are employable in the apparatus without consideration of special insulation measure, resulting in production of image forming apparatus at low costs.

Furthermore, electric discharge is not involved in forming images so that the generation of ozone and ions is suppressed, i.e. the apparatus is environmentally beneficial.

In forming images by the above-mentioned image forming method and apparatus, the dielectric film may have a greater electrostatic capacity than the image display medium. In this way, a comparatively high surface potential may be imparted to the image display medium due to the charge(s) of electrostatic latent image in allowing the dielectric film having the electrostatic latent image formed thereon to face the image display medium in the step of applying an electric field.

Stated more specifically, when the dielectric film has a greater electrostatic capacity than the image display medium, a higher potential is imparted to the image display medium surface than the voltage applied to the electrode for injecting a charge into the float electrode, whereby a greater electric field can be applied to the display layer of the image display medium.

In the image forming method described above, a step of applying an oscillating magnetic field to the display layer of the image display medium may be further carried out simultaneously with and/or after conducting the step of applying an electric field depending on the image display medium for forming an image.

The image forming apparatus described above may be further provided with a device for applying an oscillating magnetic field to the display layer of the image display medium simultaneously with and/or after applying the electric field by the electric field applying device to the display layer of the image display medium. The advantages given by applying such oscillating magnetic field to the display layer of the image display medium will be described below.

(2) Examples of the Image Display Medium

Exemplified below are first to fourth types of image display media as the image display media for forming an image by the image forming method and apparatus as described above. Of course, the image display media to be used herein are not limited to the below-mentioned media.

The image display medium has a display layer whose optical characteristics are changed by application of electric field as described above. However, it is preferred that the surface of the image display medium opposed to the dielectric film is dielectric.

<First Type Image Display Medium>

The display layer of the first type image display medium has at least one cell accommodating a dry developer. Typically, the display layer includes a plurality of cells each accommodating a dry developer.

The cells are independent of each other and each provides a closed space (sealed hollow space) for accommodating a dry developer. The dry developer contained in each of the cells can be moved in the cell but can not be moved toward adjacent cells.

Such cells may be formed, for example, between a first substrate and a second substrate with a predetermined gap therebetween. Typically at least the substrate provided on the observation side among the first substrate and the second substrate may be transparent. The substrate provided on the other side may be transparent or non-transparent. The first substrate and/or second substrate may be a resin film.

The cell can be formed between the substrates by providing at least one wall (partition wall) therebetween. In this case, a closed space defined by at least one wall and the first and second substrates may be used as one cell. The wall(s) may be used as spacer(s) for maintaining the gap between the substrates. Part or all of walls may be formed integrally of the first or second substrates.

The dry developer accommodated in any cell contains two kinds of developer particles, i.e., first and second developer particles. The dry developer may contain at least another kind or other kinds of developer particles and/or additives in addition to the two kinds of developer particles. That is to say, the dry developer includes at least two kinds of developer particles.

The two kinds of developer particles (first and second developer particles) are different from each other in optical reflection density, in other words, in color. The first and second developer particles are, for example, of black color and white color, respectively and have frictional charging capability. They are different from each other also in charging polarity. In forming an image, the first and second developer particles should be in a state frictionally charged to different polarities, but before formation of an image, the first and/or second developer particles need not be charged.

When a plurality of cells are provided, a combination of two kinds of developer particles constituting the dry developer accommodated in a cell(s) may be different from a combination of two kinds of developer particles constituting the dry developer accommodated in another cell(s).

The developer particles constituting the dry developer may be a composition comprising, for example, a binder resin, a coloring agent and the like. The coloring agent may be dispersed in the binder resin.

In this case, the binder resin may have, for example, a charge control agent, a magnetic material, resistance regulating agent and like additives dispersed therein in addition to the coloring agent. The developer particles may be composed of a coloring agent alone. The developer particles may be made magnetic by dispersing a magnetic material in the binder resin.

To form an image on the first type image display medium, an electric field, when applied to the display layer, is supplied to the dry developer accommodated in the cell(s) of the display layer. Typically an electric field directed orthogonally or substantially orthogonally to the display layer may be applied to the dry developer in the cell(s) as described above.

The cell(s) accommodates a dry developer, i.e. first and second developer particles which are different from each other in charging polarity as described above. In forming an image, one kind of first and second developer particles is charged to a positive polarity and the other kind is charged to a negative polarity. Before and/or simultaneously with application of electric field, the first and second developer particles may be frictionally charged to different polarities, for example, by stirring the developer.

When an electric field is applied to the dry developer including the first and second developer particles charged to different polarities, one kind of first and second developer particles can be moved relatively toward the observation side according to the direction of the electric field while the other kind thereof can be moved relatively toward other side than the observation side.

In other words, the first developer particles can be moved toward the observation side (or other side than the observation side) relatively to the second developer particles according to the direction of the electric field while the second developer particles can be moved toward other side than observation side (or the observation side) relatively to the first developer particles.

Thereby the color of the first developer particles is displayed in pixels wherein the first developer particles have been moved toward the observation side, whereas the color of the second developer particles is displayed in pixels wherein the second developer particles have been moved toward the observation side.

Accordingly, the desired image can be formed by applying an electric field corresponding to the image to be formed to the display layer (e.g., electric field directed according to the image information on each pixel of the image to be formed).

As described above, in image formation on the first type image display medium, the color viewed from the observation side can be changed by applying an electric field to the display layer.

In the case where at least one kind of first and second developer particles constituting the dry developer is magnetic, the first and/or second developer particles in the cell can be oscillated by applying an oscillating magnetic field to the display layer before applying an electric field, so that the first and second developer particles, respectively can be frictionally charged, resulting in an increase in a quantity of frictional charge.

Thus, when an electric field is applied to the developer, an electrostatic force exerted on the developer particles is increased and a moving force of developer particles is made greater. The flowability of first and/or second developer particles is enhanced by oscillation of these developer particles, whereby the developer particles are more easily moved. Images can be smoothly formed by application of oscillating magnetic field simultaneously with and/or after application of electric field.

<Second Type Image Display Medium>

The second type image display medium is generally called an electrophoretic type image display medium. The display layer of the second type image display medium includes an insulating liquid and a plurality of developer particles dispersed in the insulating liquid.

The insulating liquid having the developer particles dispersed therein may be retained, for example, between the first and second substrates. In this case, for example, a ring-shaped seal wall may be arranged between the first and second substrates to prevent leakage of the insulating liquid. The first and/or second substrates may be, e.g., a resin film.

The developer particles dispersed in the insulating liquid are charged to a predetermined polarity (positive or negative polarity). Consequently the developer particles can electrophoretically behave in the insulating liquid. The developer particles are different in color from the insulating liquid. For example, the developer particles and the insulating liquid have a white color and a black color, respectively.

In forming an image on the second type image display medium, an electric field is applied to the display layer, namely is supplied to the developer particles of the display layer. Typically an electric field directed orthogonally or substantially orthogonally to the display layer is applied to the developer particles.

Since the developer particles are charged as described above, the developer particles can be moved by application of electric field to the developer particles, toward the observation side or other side according to the direction of the electric field. The developer particles can electrophoretically move in the insulating liquid.

Thereby the color of the developer particles is displayed in the pixels wherein the developer particles are moved toward the observation side, whereas the color of the insulating liquid is displayed in pixels wherein the developer particles are moved toward other side than the observation side.

Accordingly, the desired image can be formed by applying an electric field corresponding to the image to be formed to the display layer (e.g., electric field directed according to the image information on each pixel of the image to be formed).

As described above, in image formation on the second type image display medium, the color viewed from the observation side can be changed by applying an electric field to the display layer.

<Third Type Image Display Medium>

The third type image display medium is generally called a twist ball type (two-color ball type) image display medium. The display layer of the third type image display medium comprises an insulating retaining medium, an insulating liquid layer and a plurality of spherical developer particles surrounded with the insulating liquid layer and embedded in the insulating retaining medium.

The insulating retaining medium is retained, for example, between first and second substrates or on one substrate. The substrates may be resin films.

The spherical developer particles are surrounded with the insulating liquid layer and embedded in the insulating retaining medium, and therefore can rotate relatively to the insulating medium. More specifically, the spherical developer particles are rotatably supported by the insulating medium via the insulating liquid layer.

A half external surface portion of each of the spherical developer particles (hereinafter called "first external surface region") and a remaining half external surface portion thereof (hereinafter called "second external surface region") have different colors. For instance, the first external surface region and the second external surface region are given a white color and a black color, respectively and are different from each other in amount of adsorbable ions.

To form an image on the third type image display medium, an electric field, when applied to the display layer, is supplied to the spherical developer particles of the display layer. Typically an electric field directed orthogonally or substantially orthogonally to the display layer may be applied to the spherical developer particles.

Since the first external surface region of each of the spherical developer particles and the second external surface region thereof are different from each other in ion adsorption, the spherical developer particles can be rotated so that the first external surface region or the second external surface region is turned toward the observation side according to the direction of the electric field applied to the spherical developer particles. The spherical developer particles are rotated to attain an electrostatically stable state according to the direction of the electric field to be applied.

Thereby in pixels wherein the first external surface regions of the spherical developer particles are turned toward the observation side, the color of first external surface regions is displayed, while in pixels wherein the second external surface regions of the spherical developer particles are turned toward the observation side, the color of second external surface regions is displayed.

Accordingly, the desired image can be formed by applying an electric field corresponding to the image to be formed (e.g., electric field directed according to the image information on each pixel of the image to be formed) to the display layer.

As described above, in image formation on the third type image display medium, the color viewed from the observation side can be changed by applying an electric field to the display layer.

<Fourth Type Image Display Medium>

The display layer of the fourth type image display medium is a liquid crystal layer. The liquid crystal layer includes a liquid crystal.

The liquid crystal layer is retained, for example, between the first and second substrates. In this case, for example, a ring-shaped seal wall may be arranged between the first and second substrates to prevent leakage of the liquid crystal. The first and/or second substrate may be a resin film.

In forming an image on the fourth type image display medium, when applied to the display layer, is supplied to the liquid crystal layer. Typically an electric field directed orthogonally or substantially orthogonally to the display layer (liquid crystal layer) is applied to the liquid crystal layer.

When an electric field is applied to the liquid crystal layer, the light reflectance and light transmittance of the liquid crystal layer are changed. Accordingly, the desired image can be formed by applying an electric field corresponding to the image to be formed (e.g., electric field directed according to the image information on each pixel of the image to be formed) to the display layer.

When an image is formed on the fourth type image display medium, the image display medium may be illuminated on the rear side when required. When a reflective type display is performed on the fourth type image display medium, a light absorbing film or a light reflecting layer may be formed on the rear side of the medium.

In forming an image on the fourth type image display medium as stated above, an electric field is applied to the display layer, so that the light reflectance and/or light transmittance can be changed.

(3) Description of Image Forming Method or Apparatus with Reference to Drawings

Embodiments of the invention will be described with reference to the accompanying drawings.

For better understanding, the image display medium for forming an image by the image forming method and apparatus will be described before explanation of the image forming method and apparatus.

Figure 2:
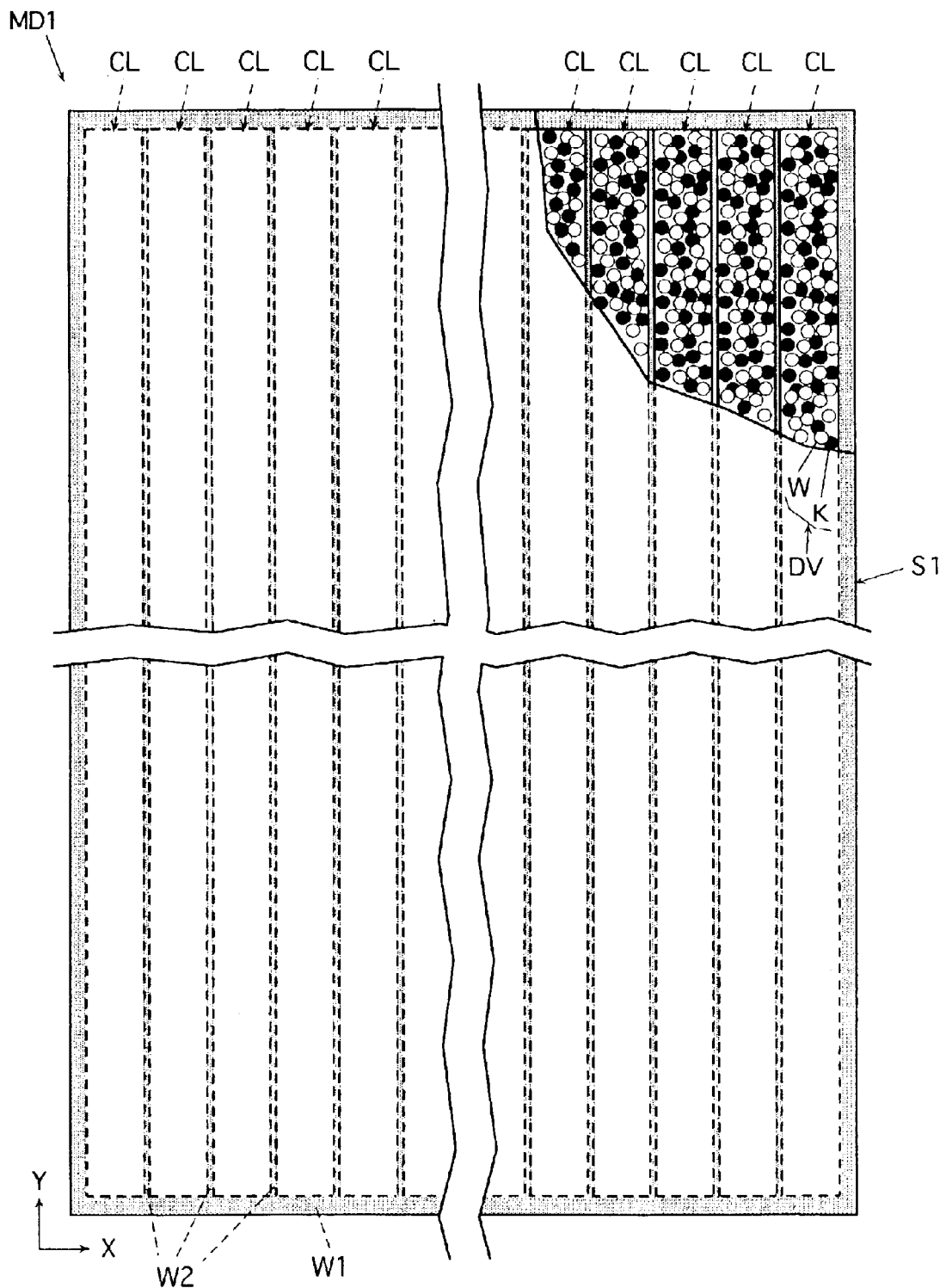
FIG. 2 is a schematic plan view showing the image display medium of FIG. 1.

FIG. 1 and FIG. 2 are a schematic sectional view and a schematic plan view, respectively showing an example of the image display medium.

The image display medium MD1 of FIGS. 1 and 2 has two substrates S1, S2 and a display layer DL1 provided between the two substrates. In FIG. 2, the substrate S1 is partly cut away to show the interior of medium MD1. The image to be displayed by the image display medium MD1 is observed from the side of the substrate S1 in this example.

In this example, the substrates S1, S2 are both made of polyethylene terephthalate (PET) and are transparent. Each of the substrates S1, S2 has a thickness of 25 $\mu$m in this example. An electrode Es is formed on the rear side surface of the substrate S2.

The display layer DL1 disposed between the substrates S1, S2 include a plurality of cells CL. All of the cells CL accommodate a dry developer DV. Each of the cells CL is closed so that the dry developer DV can move in the cells CL accommodating the dry developer DV but can not move to neighboring cells CL.

The closed space of these cells CL is defined by the substrates S1, S2, an external wall W1 therebetween and a plurality of partition walls W2 therebetween as described below. The external wall W1 is formed in the form of a frame (ring shaped) between the substrates. The plurality of partition walls W2 are made in the form of a stripe.

All of partition walls W2 are provided on the inside of the external wall W1. The walls W1 and W2 are fixed to the substrates S1, S2. Thereby a plurality of cells CL in the form of a stripe are formed between the substrates as a whole. A predetermined gap is provided between the substrates S1, S2 by the walls W1, W2. In this example, the height of walls W1, W2 is 150 $\mu$m and the gap between the substrates (height of cells) is 150 $\mu$m.

The walls W1, W2 are formed of a UV-curable acrylic resin, and have a width of 50 $\mu$m and a pitch of 350 $\mu$m. In other words, the cells CL have a width of 300 $\mu$m and a pitch of 350 $\mu$m.

The dry developer DV accommodated in the cells CL is composed of white developer particles W and black developer particles K which are different from each other in optical reflection density, in other words, in color. These developer particles W and K are frictionally chargeable and charged to different polarities. In this example, the white developer particles W and black developer particles K are charged to a negative polarity and a positive polarity, respectively.

In this example, the developer particles W, K are both formed from a composition comprising a binder resin, a pigment of predetermined color dispersed in the binder resin and a charge control agent dispersed therein. The black developer particles K contain a magnetic material dispersed in the binder resin, whereby the black developer particles K are made magnetic as well as frictionally chargeable.

Figure 3A:
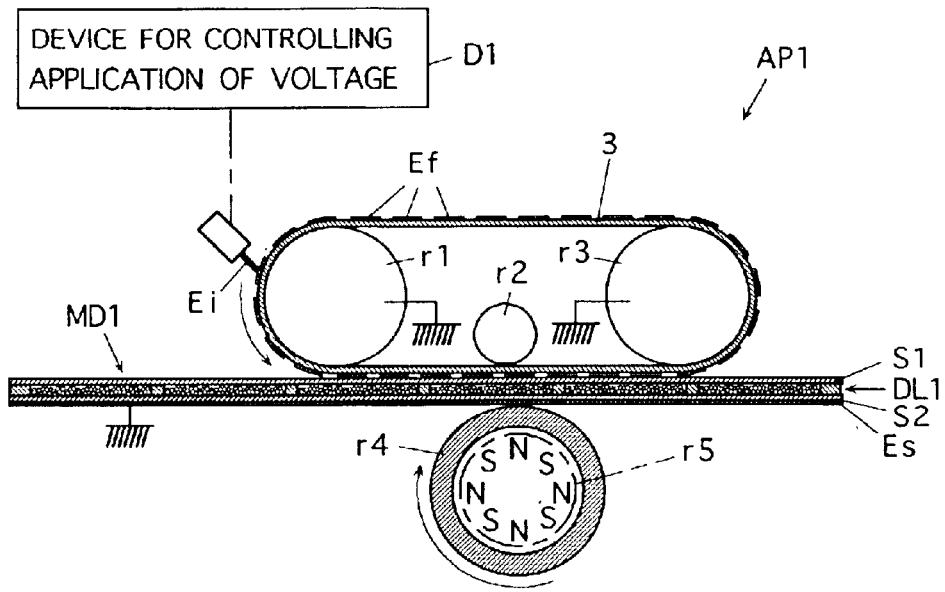
FIG. 3(A) is a schematic view showing the structure of an example of the image forming apparatus.
Figure 3B:
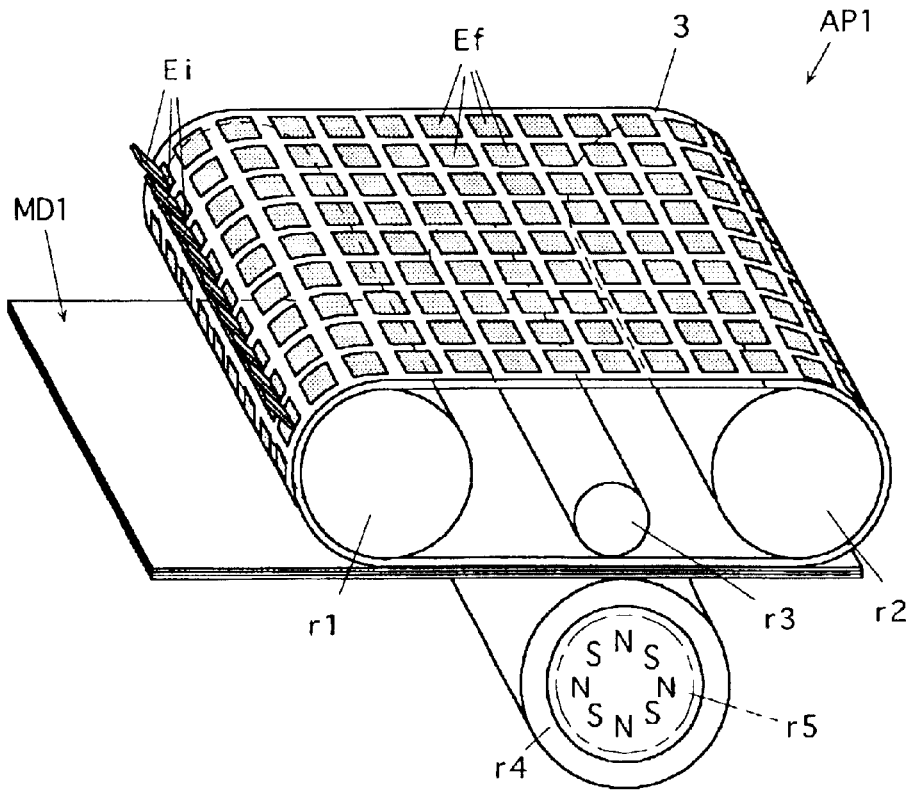
FIG. 3(B) is a schematic perspective view of the image forming apparatus.

FIG. 3(A) and FIG. 3(B) are a schematic view showing the structure of an example of the image forming apparatus capable of forming an image on the image display medium MD1 described above, and a schematic perspective view of the image forming apparatus, respectively. The image forming apparatus AP1 shown in FIG. 3(A) and FIG. 3(B) is provided to form an image by the image forming method of the invention.

The image forming apparatus AP1 has a dielectric film 3 in the form of an endless belt. The dielectric film 3 in this example is made of polyimide and is 20 $\mu$m thick.

The dielectric film 3 is wound around three rollers r1, r2, r3.

The rollers r1 and r3 have a electrically conductive surface and are grounded. The roller r1 can be driven to rotate counterclockwise in the drawing by a driving device (not shown). The surface of the dielectric film 3 is rotated by rotationally driving the roller r1.

The roller r2 is an insulating roller and is opposed to a roller r4 disposed outside the dielectric film 3. In forming an image, the image display medium MD1 is passed between the rollers r2 and r4. The roller r2 is provided to bring the dielectric film 3 into close contact with the image display medium MD1 passing between the rollers r2, r4.

A plurality of float electrodes Ef are formed on an external surface of the dielectric film 3 as follows. The float electrodes Ef are formed over the entire region of external surface of the dielectric film 3 at an equal pitch in any of axial direction of the roller r1 and a direction orthogonal thereto. In this example, any float electrode Ef assumes a square form (30 μm in each side) and is disposed at a pitch of 40 μm. The float electrodes Ef are made of copper and 1000 Å thick in this example.

A plurality of injection electrodes Ei (recording electrodes) are provided to face the external surface of the dielectric film 3 having the float electrodes Ef formed thereon to allow the injection electrodes Ei to contact with the float electrodes Ef. The injection electrodes Ei are aligned in an axial direction of the roller r1. In this example, the injection electrodes Ei are disposed at the same pitch as the float electrodes Ef.

A voltage of positive or negative polarity can be selectively applied from a device D1 for controlling application of voltage to any injection electrode Ei.

In this example, the device D1 selectively applies +50V or −50V to each of the injection electrodes Ei. Electrical charges are injected into the float electrodes Ef by bringing the injection electrodes Ei having the voltage applied thereto into contact with the float electrodes Ef. When voltages of positive and negative polarities have been applied to the injection electrodes Ei, positive and negative charges can be injected into the float electrodes Ef.

In forming an image on the image display medium MD1, the dielectric film 3 is driven to rotate counterclockwise in FIG. 3(A) by the roller r1 while the image display medium MD1 is carried in such manner that the surface of the image display medium MD1 on the side of substrate S1 (surface on the side whereon the electrode Es is not formed) is made to face the dielectric film 3. The electrode Es of the medium MD1 is grounded.

Electrical charges of desired polarity corresponding to the image to be formed are injected from the injection electrodes Ei into the float electrodes Ef on the dielectric film 3 before the electrodes Ef are made to face the image display medium MD1.

Stated more specifically, an electrical charge of positive or negative polarity corresponding to image information (image data) on each pixel of the image to be formed is injected into each of the float electrodes Ef corresponding to the pixels. An electrostatic latent image in conformity with the image to be formed is formed on the dielectric film 3 by the electrical charge injection in this way.

Figure 4:
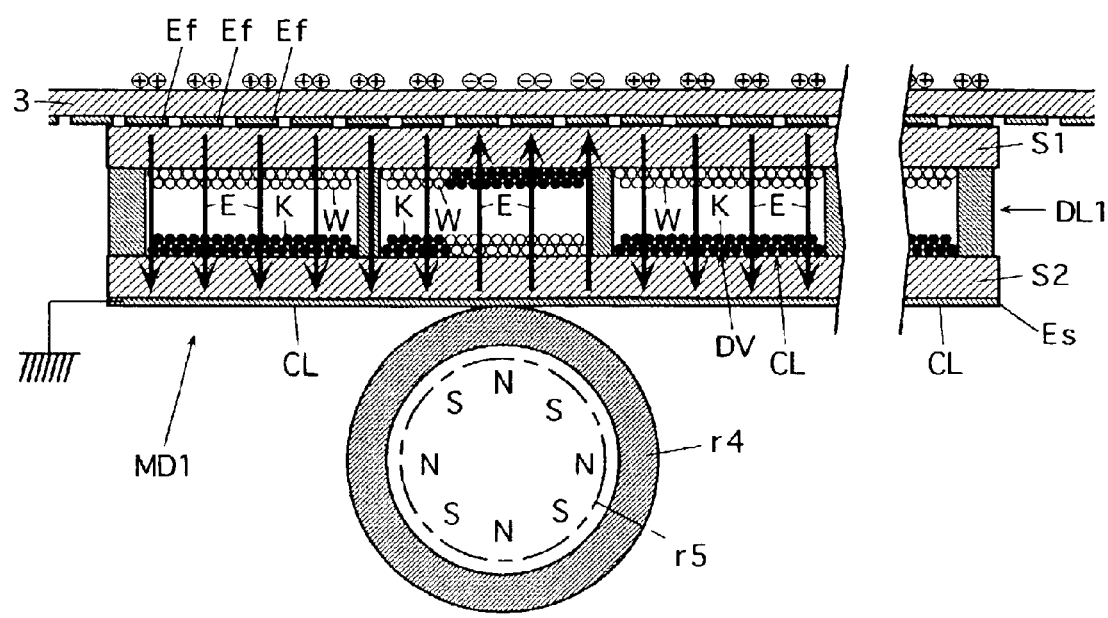
FIG. 4 shows how an image is formed on the image display medium of FIG. 1 by the image forming apparatus shown in FIG. 3(A).

After forming the electrostatic latent image in this way, the electrostatic latent image on the dielectric film 3 is contacted with the surface of the substrate S1 of the image display medium MD1 as shown in FIG. 4. Thereby the electric field formed by the electrostatic latent image (charges constituting the electrostatic latent image) is applied to the dry developer DV in the cells CL of the display layer DL1 in the image display medium MD1.

Since the electrostatic latent image corresponding to the image to be formed has been formed, the electric field according to the image to be formed is applied to the display layer DL1. More specifically, the electrostatic latent image has been formed by a charge(s) of positive polarity and a charge(s) of negative polarity so that the electric field directed according to the image information on the pixel is applied to the developer DV of each pixel in the display layer DL1.

The electric field E directed downward or upward in FIG. 4 is applied to the developer DV in the region of cells facing the float electrodes Ef having positive or negative charges injected therein.

The developer particles W and K constituting the developer DV have been frictionally charged to opposite polarities as stated above. In this example, the white developer particles W and black developer particles K are charged to a negative polarity and a positive polarity, respectively.

Consequently when an electric field E is applied to the developer DV, one group of the developer particles W and K is moved toward the substrate S1 according to the direction of the electric field due to an electrostatic force generated by the electric field and the other group is moved toward the substrate S2 as shown in FIG. 4.

The developer particles W and K are moved according to the direction of electric field applied in each pixel. The color of developer particles gathering to the side of the substrate S1, i.e. on the observation side in each pixel is displayed.

Since an electric field directed corresponding to the image information of each pixel is applied to the developer DV of each pixel as described above, the color corresponding to the image information in each pixel is displayed. Thereby the desired image is formed on the image display medium MD1 and is displayed thereon.

According to the above-described image forming method and apparatus AP1, an image is formed on the image display medium MD1 without involving electric discharge phenomenon, so that there is no need for a power source capable of generating a high voltage for effecting electric discharge, enabling production of image forming apparatus AP1 at low costs.

In the image forming apparatus AP1, a high voltage is not handled and an insulating material of low voltage resistance can be used as a material for preventing leakage of electricity in the apparatus. Further a special insulation need not be used, leading to decrease in costs for production of image forming apparatus AP1. The generation of ozone and/or ions can be suppressed because of operation without electric discharge phenomenon, whereby the apparatus is made so environmentally recommendable.

Since the electrical charges are not directly placed on the surface of the image display medium MD1, it is not necessary in rewriting the image to form a new image after erasing charges on the image display medium MD1. Thus the image forming apparatus AP1 need not be provided with a charge removing device to erase charges on the image display medium MD1 before forming a new image, resulting in lower costs for producing the image forming apparatus AP1.

Further, when the image is rewritten, it is sufficient to inject a charge(s) of predetermined polarity from the injection electrodes Ei without taking the trouble to remove the charges on the float electrodes Ef of the dielectric film 3.

In forming an image on the image display medium MD1, image formation can be effected while applying an oscillating magnetic field to the developer DV of the display layer DL1.

For example, an image may be formed while applying an oscillating magnetic field to the developer DV by a magnet roller r5 shown in FIG. 3(A), FIG. 3(B) and FIG. 4. The magnet roller r5 has a plurality of magnetic poles so that an oscillating magnetic field can be applied to the developer DV in the cells CL by rotationally driving the magnet roller r5 clockwise or counterclockwise in the drawing.

Alternatively an oscillating magnetic field can be applied to the developer DV in the cells CL by reciprocatingly rotational driving of the magnet roller r5.

The developer DV can be stirred by applying the oscillating magnetic field to the developer DV containing the developer particles K and W in which the black developer particles K are magnetic as stated above. Thereby the developer particles W and K constituting the developer DV are imparted increased fluidity and are made more movable.

The developer particles W and K are frictionally charged by agitation, resulting in an increase in charge quantity of developer particles and in electrostatic force built up by application of electric field, whereby the developer particles W and K are made more movable.

The oscillating magnetic field may be applied to the developer DV by a magnet sheet to be made to face the image display medium being transported, instead of the magnet roller.

In forming an image on the image display medium using a dielectric film as described above, an image can be formed at a relatively low voltage by utilizing a greater electrostatic capacity in the dielectric film than in the image display medium as described below.

In the image forming apparatus AP1, the dielectric film 3 is permitted to retain an electrical charge in a quantity of $Q_F$ shown in the following equation (1) by injecting an electrical charge into the float electrode Ef:

$$Q_F = C_F \cdot V_0 \quad (1)$$

where $V_0$ is a voltage to be applied to the injection electrode Ei; and $C_F$ is an electrostatic capacity of the dielectric film 3.

When the dielectric film 3 bearing a charge in a quantity of $Q_F$ is made to face the image display medium MD1, a potential $V_1$ represented by the following equation (2) according to an electrostatic capacity $C_M$ of the medium DM1 is generated on the surface (surface of the substrate S1) on the side of the medium MD1 which is made to face the film 3:

$$V_1 = (C_F / C_M) \cdot V_0 \quad (2)$$

Therefore, a higher voltage than the voltage $V_0$ to be applied to the injection electrode Ei can be applied to the image display medium MD1 by giving a greater electrostatic capacity $C_F$ to the dielectric film 3 than the capacity $C_M$ of the image display medium MD1.

When an image was experimentally formed by the image forming apparatus AP1 of the type shown in FIG. 3(A) using the following dielectric film 3 and the image display medium MD1, a higher medium surface potential $V_1$ than the injection voltage $V_0$ was obtained.

A polyimide (PI) film having a thickness $d_F$ of 22 $\mu$m, and a dielectric constant $\epsilon_F$ of 3.5 was used as the dielectric film 3.

A film made of polyethylene terephthalate (PET) having a thickness $d_s$ of 25 $\mu$m, and a dielectric constant $\epsilon_S$ of about 3.2 was used as the substrates S1, S2 of the image display medium MD1. The display layer DL1 of the image display medium MD1 had an apparent dielectric constant $\epsilon_D$ of about 2.1. The display layer DL1 had a thickness $d_D$ of 150 $\mu$m.

When an image was formed by selectively applying +50V or −50V to each of the injection electrodes Ei, about ±200V was obtained as the surface potential $V_1$ of the substrate S1. When an image was formed by applying an oscillating magnetic field with the magnet roller r5, an image display was performed at an image density of 0.9 in a black display portion and 0.5 in a white display portion.

Although a power source sufficient to supply an output of several kV is required in forming an image by means of electric discharge phenomenon, it is clear that an image can be formed at a low voltage by the image forming apparatus AP1.

The image display medium capable of forming an image by the image forming apparatus AP1 is not limited only to the medium MD1 of FIG. 1. The apparatus AP1 can form images on image display media having a display layer whose optical characteristics are changed by applying an electric field.

Figure 5A:
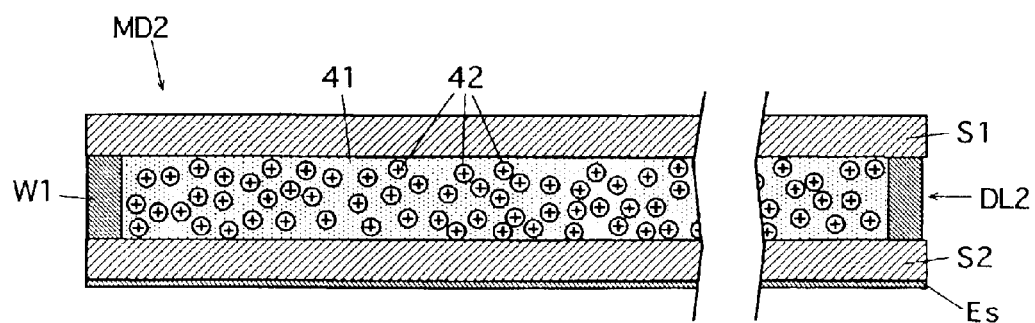
FIG. 5(A) is a schematic sectional view showing another example of the image display medium, and FIG. 5(B) indicates how an image is formed on the image display medium by the image forming apparatus shown in FIG. 3(A).

Another example of the image display medium capable of forming an image by the image forming apparatus AP1 is shown in a schematic sectional view of FIG. 5(A).

The image display medium MD2 of FIG. 5(A) is a so-called electrophoretic type medium. The image display medium MD2 has substrates S1, S2 and a display layer DL2 therebetween. The substrates S1, S2 are PET films in this example. An electrode Es is formed on the rear side of the substrate S2.

The display layer DL2 includes an insulating liquid 41, and a plurality of developer particles 42 dispersed in the insulating liquid 41. The developer particles 42 are charged to a predetermined polarity, and to a positive polarity in this example. The insulating liquid 41 and the developer particles 42 are different in color from each other, and are black and white, respectively in this example.

The insulating liquid 41 is a mixture of a high purity petroleum (product of ESSO, trade name "ISOPER") with an organic material containing an ionic surfactant and a dye. The ionic surfactant is adsorbed on the organic developer particles 42 containing a pigment so that the particles 42 are stably electrochemically charged.

The insulating liquid 41 having the developer particles 42 dispersed therein is prevented from leaking between the substrates S1, S2 by a wall W1 formed in a ring shape therebetween.

Figure 5B:
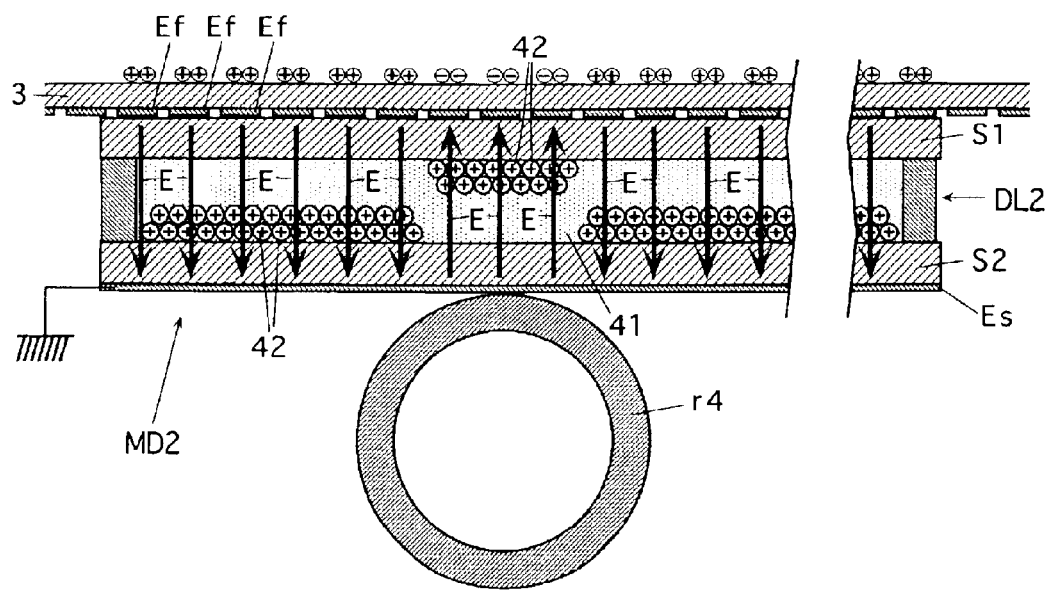

When an image is formed on the image display medium MD2 by the image forming apparatus AP1, electric fields E are applied to the charged developer particles 42, as shown in FIG. 5(B), by the charges constituting the electrostatic latent image formed on the dielectric film 3 as done in forming an image on the image display medium MD1.

The developer particles 42 are electrophoretically moved toward the substrates S1, S2 in the insulating liquid 41 according to the direction of the applied electric fields. In this example, the developer particles 42 are charged to a positive polarity so that the particles 42 exerted thereon by a downward electric field in FIG. 5(B) are moved toward the substrate S2, and the particles 42 exerted thereon by an upward electric field are moved toward the substrate S1.

Thereby the color of the developer particles 42 (white in this example) is displayed in the pixels wherein the developer particles 42 cluster toward the substrate S1 on the observation side, while the color of the insulating liquid 41 (black in this example) is displayed in the pixels wherein the developer particles 42 cluster toward the substrate S2. The desired image can be formed since the electric field directed corresponding to the image information on each pixel is applied to the developer particles 42 of each pixel.

Figure 6A:
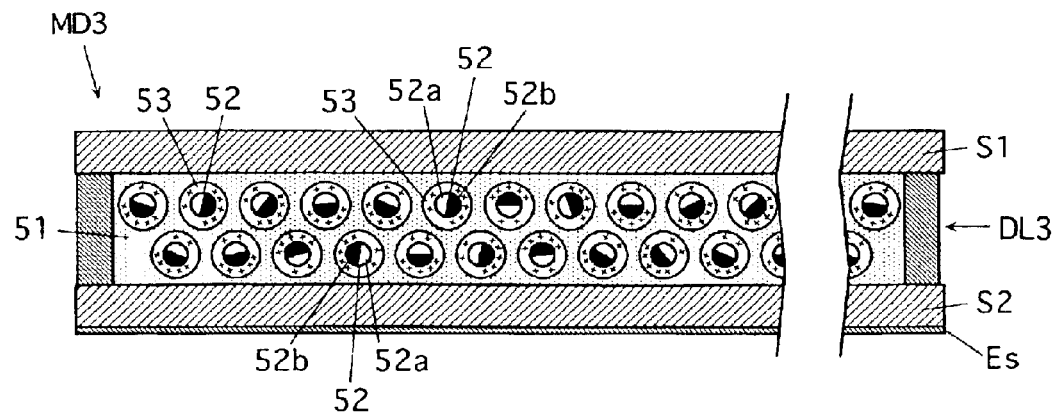
FIG. 6(A) is a schematic sectional view showing a further example of the image display medium, and FIG. 6(B) indicates how an image is formed on the image display medium by the image forming apparatus shown in FIG. 3(A)

FIG. 6(A) is a schematic sectional view showing a further example of the image display medium on which an image can be formed by the image forming apparatus AP1.

The image display medium MD3 of FIG. 6(A) is generally called a twist ball type (two-color ball type) medium. The image display medium MD3 includes substrates S1, S2 and a display layer DL3 therebetween. The substrates S1, S2 are PET films in this example. An electrode Es is formed on the rear side of the substrate S2.

The display layer DL3 includes an insulating retaining medium 51 and a plurality of spherical developer particles 52 embedded in the insulating retaining medium 51.

Any of developer particles 52 is embedded in the retaining medium 51 and surrounded with an insulating liquid layer 53. In this way, the developer particles 52 are supported by the retaining medium 51 via the liquid layer 53. Accordingly the developer particles 52 can rotate relatively to the retaining medium 51.

Each spherical developer particle 52 has a semispherical portion (external surface region 52a) and the other semispherical portion (external surface region 52b). These portions are different in color from each other. In this example, the external surface region 52a and the external surface region 52b have a white color and a black color, respectively.

The external surface region 52a of each of the spherical developer particles 52 is different from the external surface region 52b in amount of adsorbable ions. In this example, the external surface region 52b is greater in ion adsorption than the external surface region 52a.

The display layer DL3 including such developer particles 52, the insulating liquid layer 53 and the insulating retaining medium 51 can be produced, for example, as follows.

The developer particles 52 may be produced, for example, by uniformly placing white spherical particles of glass chiefly comprising $TiO_2$ on an appropriate support and coating the particles with chrome or the like by vapor deposition. The developer particles 52 have a particle size of, e.g., 30 μm to 100 μm. Then the developer particles 52 are dispersed in the insulating retaining medium 51, e.g., an elastomer. The insulating retaining medium 51 is swollen by its immersion in a solution prepared by dissolving an ionic surfactant in an organic solvent such as toluene.

Thereby the developer particles 52 become surrounded with the insulating liquid layer 53. In this way, the developer particles 52 are embedded in the retaining medium 51 and surrounded with the insulating liquid layer 53. The external surface regions 52a, 52b of the developer particles 52 differ from each other in characteristics and thus in ion adsorption.

Figure 6B:
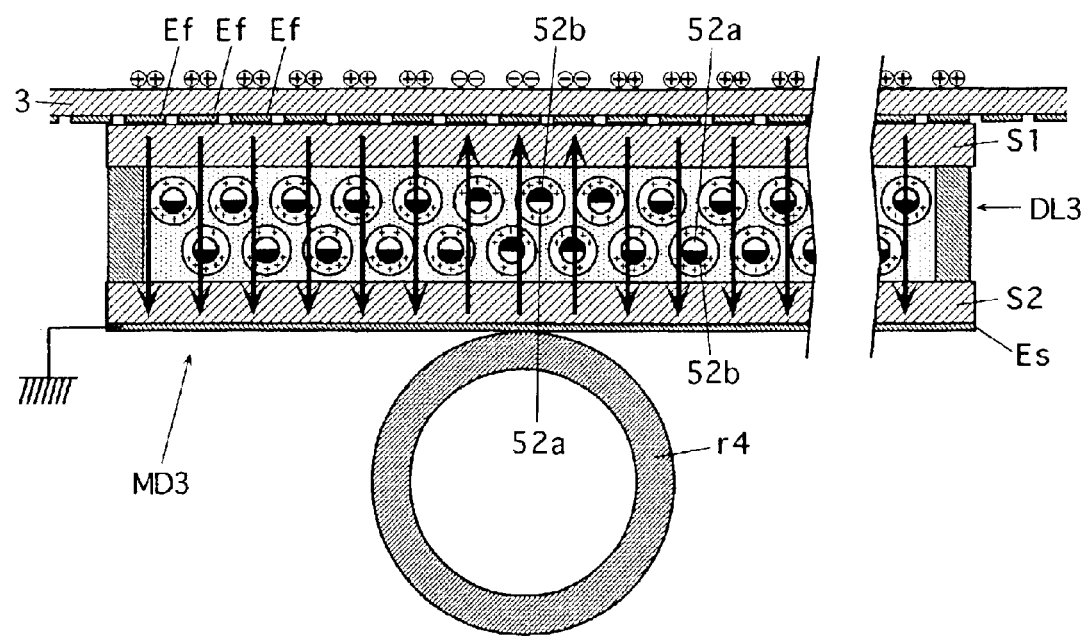

In forming an image on the image display medium MD3 by the image forming apparatus AP1, electric fields are applied to the developer particles 52, as shown in FIG. 6(B), by the charges constituting the electrostatic latent image formed on the dielectric film 3 as done in forming an image on the image display medium MD1.

Since the external surface regions 52a of the spherical developer particles 52 are different from the external surface regions 52b in ion adsorption, the developer particles 52 are rotated such that the particles 52 are made electrostatically stable according to the direction of the electric fields, when the developer particles 52 are exerted on by the electric fields.

That is to say, the developer particles 52 exerted on by a downward electric field in FIG. 6(B) are rotated so that the external surface region 52a having a lower ion adsorption turns upward. The developer particles 52 exerted on by an upward electric field in FIG. 6(B) are rotated so that the external surface region 52a having a lower ion adsorption turns downward.

Thereby the color of the external surface region 52a (white in this example) is displayed in the pixels wherein the region 52a turns toward the substrate S1 on the observation side, while the color of the external surface region 52b. (black in this example) is displayed in the pixels wherein the region 52b turns toward the substrate S1. The desired image can be formed since the electric field directed corresponding to the image information of pixels is applied to the developer particles 52 of each pixel.

Figure 7A:
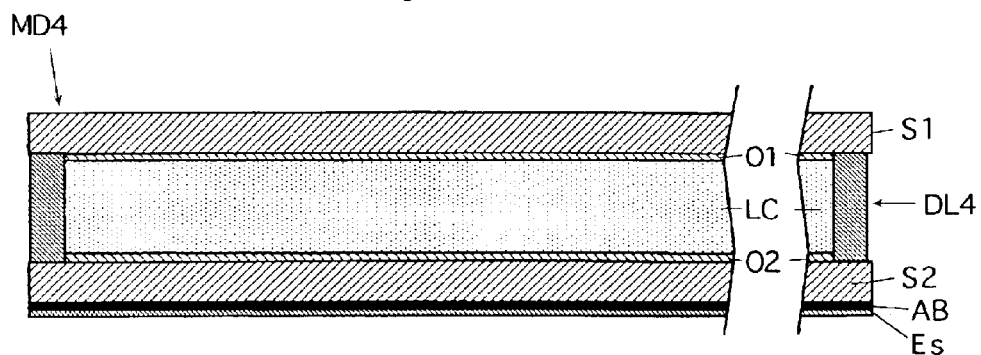
FIG. 7(A) is a schematic sectional view showing a still further example of the image display medium, and FIG. 7(B) and FIG. 7(C) indicate how an image is formed on the image display medium by the image forming apparatus shown in FIG. 3(A).

FIG. 7(A) is a schematic sectional view showing a still further example of the image display medium on which an image can be formed by the image forming apparatus AP1.

The image display medium MD4 of FIG. 7(A) includes substrates S1, S2 and a display layer DL4 therebetween. The substrates S1, S2 are PET films in this example. Orientation films O1, O2 are provided on internal surfaces of the substrates S1, S2, respectively. A black light absorbng film AB and an electrode Es are formed on the rear side of the substrate S2.

The display layer DL4 is a liquid crystal layer formed of liquid crystal LC. The liquid crystal LC used in this example is a chiral nematic liquid crystal comprising a nematic liquid crystal and a chiral material. The liquid crystal LC exhibits a cholesteric phase at room temperature. The liquid crystal LC has a selective reflective peak wavelength in each of a red wavelength range and a yellow wavelength range, and can selectively reflect light in red and yellow ranges.

Figure 7B:
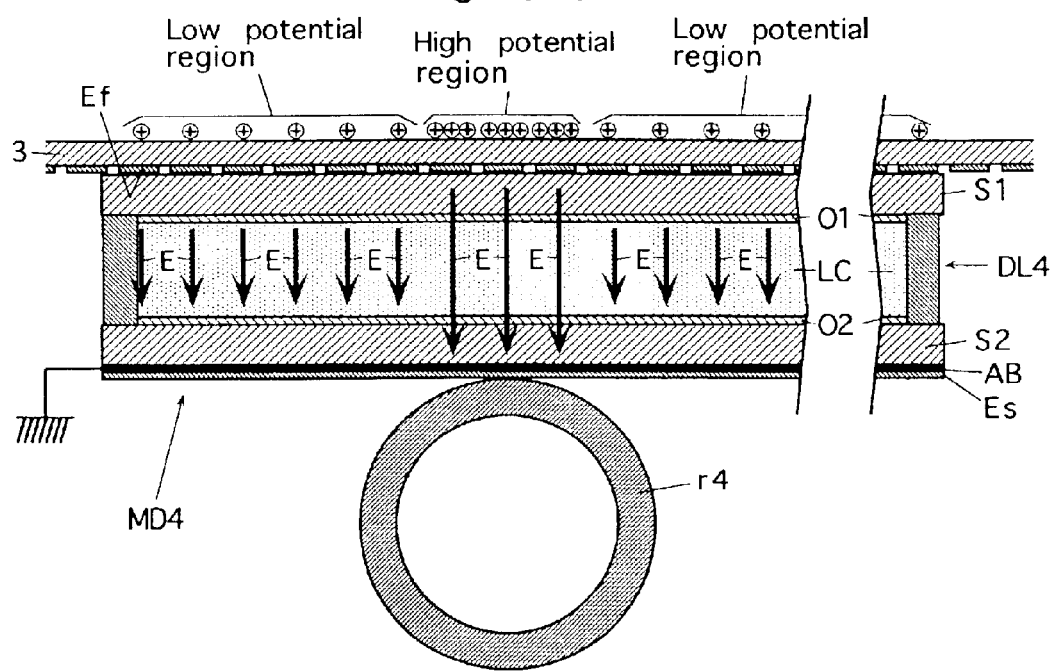
Figure 7C:
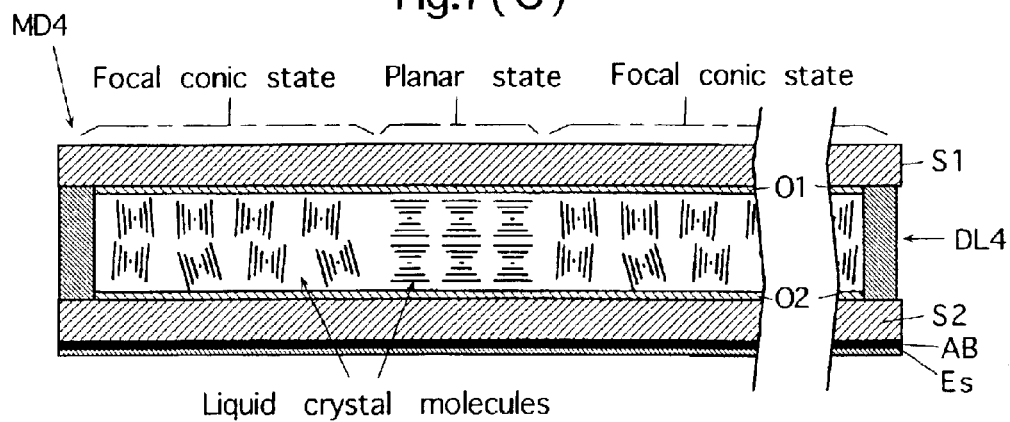

In forming an image on the image display medium MD4 by the image forming apparatus AP1, e.g., the following electrostatic latent image is formed on the dielectric film 3. When electrical charges are injected into the float electrodes Ef on the dielectric film 3, voltages are applied at the same polarity to the injection electrodes Ei. The float electrodes Ef are supplied with voltages of magnitudes corresponding to the image information of pixels corresponding to the float electrodes Ef. Thereby an electrostatic latent image having a high potential region and a low potential region is formed on the dielectric film 3 as shown in FIG. 7(B).

Accordingly, when the electrostatic latent image formed on the dielectric film 3 is made to face the image display medium MD4, the liquid crystal LC is supplied with electric fields of magnitudes corresponding to the surface potentials of the dielectric film 3.

When the electric fields are applied to the chiral nematic liquid crystal LC, the liquid crystal LC is made homeotropic. More specifically the liquid crystal LC is made completely homeotropic or incompletely homeotropic depending on the magnitude of applied electric field.

Thereafter the dielectric film 3 is released from the image display medium MD4 and the application of electric field to the liquid crystal LC is stopped, whereupon the liquid crystal is brought to the following state depending on the state of liquid crystal LC at the time that the electric field has been applied.

When the liquid crystal LC has been brought to a completely homeotropic state by applying a relatively great electric field, the liquid crystal LC of the pixels assumes a planar state (selective reflection state) and reflects light of selective reflection wavelengths. In this example, the liquid crystal LC has selective reflection peak wavelengths in red and yellow wavelength ranges, so that a white (red+yellow) color is displayed in the pixels wherein the liquid crystal LC has been brought to the state of selective reflection.

The liquid crystal LC of pixels with a relatively small electric field applied thereto takes a focal conic state (transparent state), and the color (black in this example) of light absorbing film AB is displayed in the pixels. The liquid crystal LC of pixels with an intermediate-magnitude electric field applied thereto takes a mixture of planar state and focal conic state, and a neutral color is displayed in the pixels.

Since an electric field of magnitude corresponding to the image information of each pixel is applied to the liquid crystal LC of each pixel, the contemplated image can be formed in the image display medium MD4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus for forming an image on an image display medium having a display layer whose optical characteristics are changed by application of electric field, the apparatus comprising:

a dielectric film having a plurality of float electrodes formed thereon;

a device for forming an electrostatic latent image, the device being capable of forming the electrostatic latent image corresponding to the image to be formed on the dielectric film by injecting an electrical charge into at least one float electrode among the plurality of float electrodes; and a device for applying an electric field formed by the electrostatic latent image on the dielectric film to the display layer of the image display medium by bringing the electrostatic latent image formed on the dielectric film to a position opposed to the image display medium.

2. The image forming apparatus according to claim 1, wherein the dielectric film has a greater electrostatic capacity than the image display medium.

3. The image forming apparatus according to claim 1 which is further provided with a device for applying an oscillating magnetic field to the display layer of the image display medium simultaneously with and/or after applying the electric field to the display layer of the image display medium with the electric field applying device.

4. The image forming apparatus according to claim 1, wherein the display layer of the image display medium includes at least one cell accommodating a dry developer, the dry developer in the cell including first and second developer particles having frictional charging capability which are different from each other in optical reflection density and in charging polarity; and wherein the electric field is applied to the first and second developer particles of the dry developer in the cell(s) by the electric field applying device, so that one group of the first and second developer particles is relatively moved toward an observation side and the other group of the developer particles is relatively moved toward other side than the observation side according to direction of the electric field.

5. The image forming apparatus according to claim 1, wherein the float electrodes are formed on the dielectric film at a uniform density and in conformity with each pixel of the image to be formed.

6. The image forming apparatus according to claim 1, wherein the device for forming an electrostatic latent image is provided with injection electrodes for injecting an electrical charge into the float electrodes and a device for applying a voltage to the injection electrodes, and wherein the injection electrodes are brought into contact with the float electrodes and the electrical charge is injected into the float electrodes by applying the voltage to the injection electrodes with the voltage applying device.

7. The image forming apparatus according to claim 1, wherein the electric field applying device applies to the display layer of the image display medium the electric field formed by the electrostatic latent image on the dielectric film by bringing the electrostatic latent image formed on the dielectric film into contact with, or bringing the same close to, the image display medium.

8. The image forming apparatus according to claim 1 which is provided with a device for setting an electrode formed on the image display medium at a predetermined potential when the electrostatic latent image formed on the dielectric film is brought to the position opposed to the image display medium, the electrode of the image display medium is formed on other surface of the image display medium than a surface which is made to face the dielectric film.

9. An image forming method of forming an image on an image display medium having a display layer whose optical characteristics are changed by application of electric field, the method comprising the steps of:

forming an electrostatic latent image corresponding to the image to be formed on a dielectric film having a plurality of float electrodes formed thereon by injecting an electrical charge into at least one of the float electrodes; and applying an electric field formed by the electrostatic latent image on the dielectric film to the display layer of the image display medium by bringing the electrostatic latent image formed on the dielectric film to a position opposed to the image display medium.

10. The image forming method according to claim 9, wherein the dielectric film has a greater electrostatic capacity than the image display medium.

11. The image forming method according to claim 9 which includes a step for applying an oscillating magnetic field to the display layer of the image display medium simultaneously with and/or after the step of applying an electric field.

12. The image forming method according to claim 9, wherein the display layer of the image display medium includes at least one cell accommodating a dry developer, the dry developer in the cell including first and second developer particles having frictional charging capability which are different from each other in optical reflection density and in charging polarity; and wherein in the step of applying an electric field, one group of the first and second developer particles is relatively moved toward an observation side and the other group of the developer particles is relatively moved toward other side than the observation side according to direction of the electric field.

13. The image forming method according to claim 9, wherein the dielectric film is formed of at least one material selected from the group consisting of polyimide, polyester, polyethylene and polypropylene.

14. The image forming method according to claim 9, wherein the electrostatic latent image formed on the dielectric film is brought into contact with or brought close to the image display medium when the electric field is applied to the display layer of the image display medium.

15. The image forming method according to claim 9, wherein the image display medium includes a cell(s) formed between substrates by forming at least one wall therebetween.

* * * * *